United States Patent [19]

Clevenger et al.

[11] Patent Number: 5,207,559
[45] Date of Patent: May 4, 1993

[54] VARIABLE GEOMETRY DIFFUSER ASSEMBLY

[75] Inventors: Lloyd L. Clevenger; John D. Sullivan, both of Phoenix, Ariz.

[73] Assignee: Allied-Signal Inc., Morris Township, N.J.

[21] Appl. No.: 735,500

[22] Filed: Jul. 25, 1991

[51] Int. Cl.⁵ ............................................. F01D 17/16
[52] U.S. Cl. .................................................... 415/166
[58] Field of Search ............... 415/159, 160, 161, 163, 415/164, 165, 166

[56] References Cited

U.S. PATENT DOCUMENTS

| | | |
|---|---|---|
| Re. 31,835 | 2/1985 | Rannenberg . |
| 2,566,550 | 9/1951 | Birmann . |
| 2,860,827 | 11/1958 | Egli ..................... 415/164 |
| 3,029,067 | 4/1962 | Parker et al. ......... 415/163 |
| 3,069,070 | 12/1962 | Macaluso et al. . |
| 3,243,159 | 3/1966 | Hefler et al. ......... 415/166 |
| 3,314,654 | 4/1967 | Thenault et al. . |
| 3,326,522 | 6/1967 | Pickering . |
| 3,372,862 | 3/1968 | Koenig, III ........... 415/161 |
| 3,588,270 | 6/1971 | Boelcs . |
| 3,799,694 | 3/1974 | Duzan . |
| 3,957,392 | 5/1976 | Blackburn . |
| 3,992,128 | 11/1976 | Lunsford et al. . |
| 4,292,807 | 10/1981 | Rannenberg . |
| 4,300,869 | 11/1981 | Swearingen . |
| 4,325,673 | 4/1982 | Hall, Jr. . |
| 4,338,063 | 7/1982 | Nakanishi . |
| 4,405,290 | 9/1983 | Rannenberg . |
| 4,503,684 | 3/1985 | Mount et al. . |
| 4,527,949 | 7/1985 | Kirtland . |
| 4,544,325 | 10/1985 | Rogo et al. . |
| 4,549,847 | 10/1985 | Stroem et al. . |
| 4,573,868 | 3/1986 | Stroem et al. . |
| 4,586,870 | 5/1986 | Hohlweg et al. . |
| 4,611,969 | 9/1986 | Zinsmeyer . |
| 4,616,483 | 10/1986 | Leonard . |
| 4,642,026 | 2/1987 | Ruff . |
| 4,685,869 | 8/1987 | Sasaki ..................... 415/163 |
| 4,693,073 | 9/1987 | Blackburn . |
| 4,718,819 | 1/1988 | Rogo et al. . |
| 4,737,071 | 4/1988 | Horn, Jr. . |
| 4,780,049 | 10/1988 | Palmer et al. . |
| 4,815,935 | 3/1989 | Gottemoller . |
| 4,844,690 | 7/1989 | DeLaurier et al. . |
| 4,932,835 | 6/1990 | Sorokes . |
| 4,955,788 | 9/1990 | Kimura et al. . |

FOREIGN PATENT DOCUMENTS

| | | |
|---|---|---|
| 0058583 | 8/1982 | European Pat. Off. . |
| 2064617 | 7/1971 | France . |
| 2485102 | 5/1980 | France . |
| 57-8400 | 6/1982 | Japan . |
| 1291725 | 4/1980 | U.S.S.R. . |
| 1058898 | 2/1967 | United Kingdom . |

OTHER PUBLICATIONS

PCT International Search Report.

*Primary Examiner*—Edward K. Look
*Assistant Examiner*—Christopher M. Verdier
*Attorney, Agent, or Firm*—Jerry J. Holden; James W. McFarland; Robert A. Walsh

[57] ABSTRACT

An improved variable geometry diffuser assembly is provided. This assembly includes a variety of features that reduce the leakage and improve the precision within the assembly. These features include: sealing disks mounted to the vane; cantilevered vanes mounted for rotation to coolside diffuser wall only, thereby reducing the effects of thermal growth on the assembly; and self lubricating, non-metallic bushings for supporting the various components in the assembly thereby reducing friction and any need for lubrication. Each vane is coupled to a single unison ring through an arm member also employing non-metallic bushings.

9 Claims, 5 Drawing Sheets

VARIABLE GEOMETRY DIFFUSER ASSEMBLY

TECHNICAL FIELD

This invention relates generally to centrifugal compressors for gas turbine engines, and in particular to a variable geometry diffuser assembly for such compressors.

BACKGROUND OF THE INVENTION

Auxiliary power units are mounted aboard many types of aircraft to supply pneumatic and/or shaft horsepower to drive accessories such as electric generators or hydraulic pumps. At the core of the auxiliary power unit is a small gas turbine comprised in flow series arrangement of a compressor, a combustor, and a turbine. The turbine is coupled to the compressor and to a gearbox via a rotating shaft. Pneumatic power in the form of bleed air is extracted from the gas turbine engine through a bleed port positioned between the compressor and combustor. When pneumatic power is required the bleed port is opened and pressurized air is bled off from the engine. However, when only shaft horsepower is required the bleed port is closed. The closing of the bleed port backpressures the compressor and may drive it into a surge condition. To prevent the surging of the compressor a surge bleed valve is operably disposed within the the bleed port and opens to relieve the backpressure by bleeding off air and dumping it overboard. This dumped air is lost energy which must be compensated for by increasing the fuel flow to the engine.

Often, the type of compressor used in these engines is a centrifugal or radial type compressor. Centrifugal compressors include an impeller mounted for rotation in a support housing. The housing also defines a diffuser extending radially outward from the impeller's exit and having a plurality of fixed diffuser vanes disposed therein. As the impeller rotates, a stream of air or other gas is generated that flows from the inlet of the impeller to the impeller's exit. The kinetic energy of the rotating impeller is transferred to the gas stream resulting in high velocity gas exiting the impeller. The diffuser reduces the high absolute velocity of the gas and converts its kinetic energy into static head or pressure.

While these compressors operate over a variety of flow conditions and ranges, they are designed to operate most efficiently at one set of operating conditions, usually referred to as the design point. In the case of Auxiliary Power Units, the compressor is designed for maximum efficiency and minimum adequate surge margin when operating with the bleed port closed and supplying maximum shaft horsepower. As a consequence of selecting these design conditions, when the bleed port is opened the compressor is operating off design and at reduced efficiency. It has long been recognized, that a compressor's efficiency off design can be improved by varying the diffuser area as the operating point of the compressor changes while still maintaining adequate surge margin.

Some have proposed devices for varying the width of the diffuser as the compressor's operating point changes. Examples of such systems can be found in U.S. Pat. Nos. 4,932,835, 4,884,690, 4,616,483, 4,527,949, and U.S. Pat. No. 4,503,684. However, because of the mechanical complexity of these devices they are not suited for use aboard an aircraft where light weight and high reliability are critical requirements.

Others have proposed devices that rotate or pivot the diffuser vanes to vary the throat area of the diffuser as the operating point changes and thereby maintain sufficient surge margin. Examples of these systems can be found in U.S. Pat. Nos. 4,737,071, 4,718,819, 4,554,325, 4,338,063, 4,325,673, and U.S. Pat. No. 3,992,128.

In general, one shortcoming of these prior art devices is aerodynamic inefficiency caused by leakage of gas around the pivoted diffuser vanes from their pressure side to their suction side. This leakage results from the necessity of maintaining an operating clearance between the vanes and the side walls. This clearance must be large enough to permit the vanes to freely rotate, and also be large enough to accommodate any thermal growth or distortion in the vanes and walls that may occur during the operation of the engine. Further, leakage occurring in the vicinity of the leading edge of the vane is most troublesome as that is where the largest pressure differential occurs. One approach to reducing this leakage is taught by Hall, U.S. Pat. No. 4,325,673 which discloses diffuser vanes having elastomeric inner portions which expand to seal against the diffuser side walls as the vanes are rotated.

Another deficiency in the prior art devices is their inability to accurately pivot all of the vanes to the same angle due to backlash and mechanical play in the linkages connecting the vanes to an actuator. The backlash and mechanical play is generally caused by the need for large operating clearances to overcome thermal growth and misalignment of the linkages caused from excessive friction between linkages and inherent errors in manufacturing processes used to manufacture the various components.

Accordingly, there is a need for an improved variable diffuser vane assembly in which the shortcomings of the prior art devices are minimized.

SUMMARY OF THE INVENTION

An object of the present invention is to provide a variable diffuser vane assembly for a centrifugal compressor having improved sealing means for reducing the leakage around the vanes.

Another object of the present invention is to provide a variable diffuser vane assembly for a centrifugal compressor in which the individual components of the assembly are linked in such manner so as to reduce backlash and provide extremely accurate alignment and positioning of the diffuser vanes, while minimizing friction.

Yet another object of the present invention is to provide a variable diffuser vane assembly for a centrifugal compressor that is lightweight and reliable.

Yet still another object of the present invention is to provide a variable diffuser vane assembly for a centrifugal compressor that varies the area of the diffuser to keep the compressor away from surge.

The present invention achieves the above-stated objectives by providing a diffuser vane assembly that incorporates a plurality of features which act to reduce leakage and friction throughout the assembly. These features include: sealing disks mounted on both the upper and lower edges of the vanes at the vanes leading edge to reduce leakage around the vane; cantilevered vanes mounted for rotation to the coolside diffuser wall only, thereby reducing the effects of thermal growth on the assembly; and self lubricating, non-metallic bushings for supporting the various components in the assembly thereby reducing friction and any need for lubrication.

These and other objects, features and advantages of the present invention, are specifically set forth in, or will become apparent from, the following detailed description of a preferred embodiment of the invention when read in conjunction with the accompanying drawings.

DESCRIPTION OF THE PREFERRED EMBODIMENT

Figure 1:
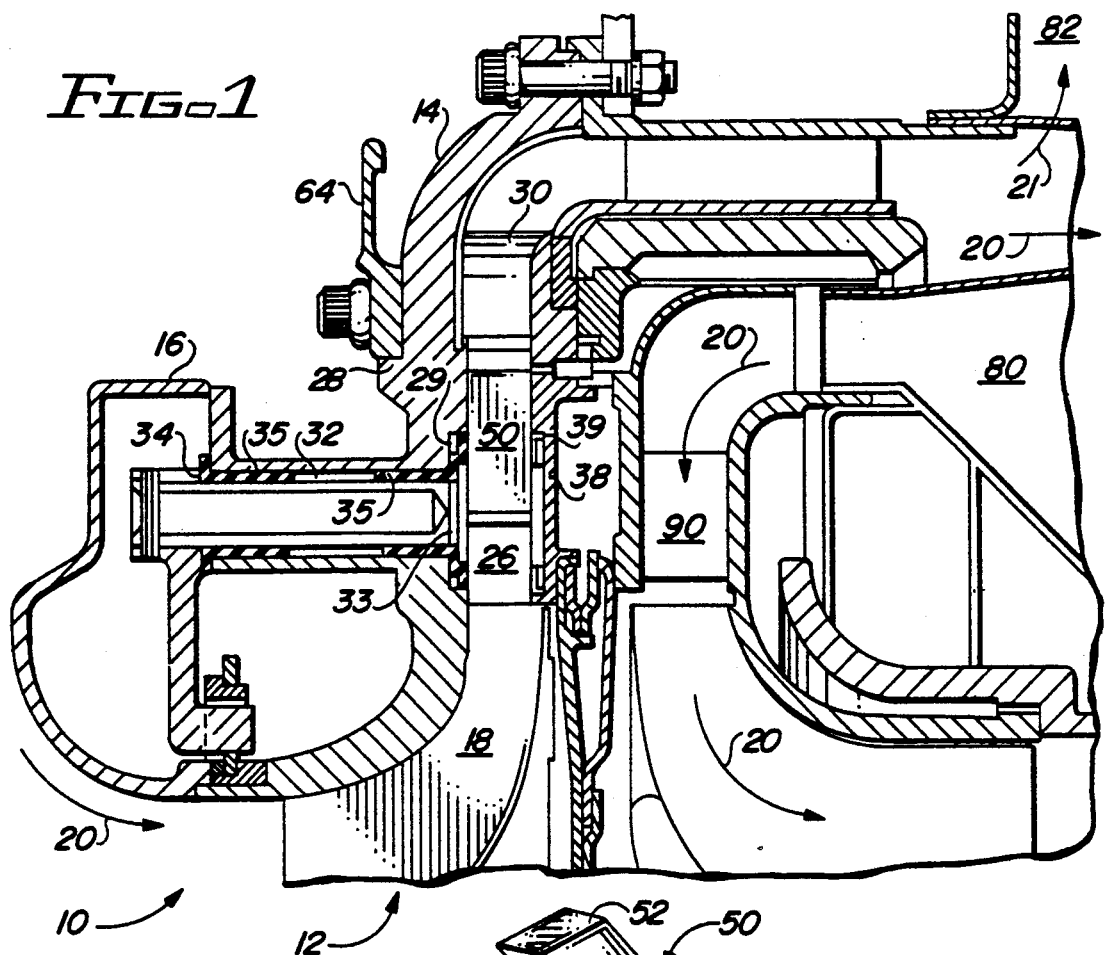
FIG. 1 is a cross-sectional view of a compressor section of a gas turbine engine having a variable diffuser vane assembly contemplated by the present invention.
Figure 2:
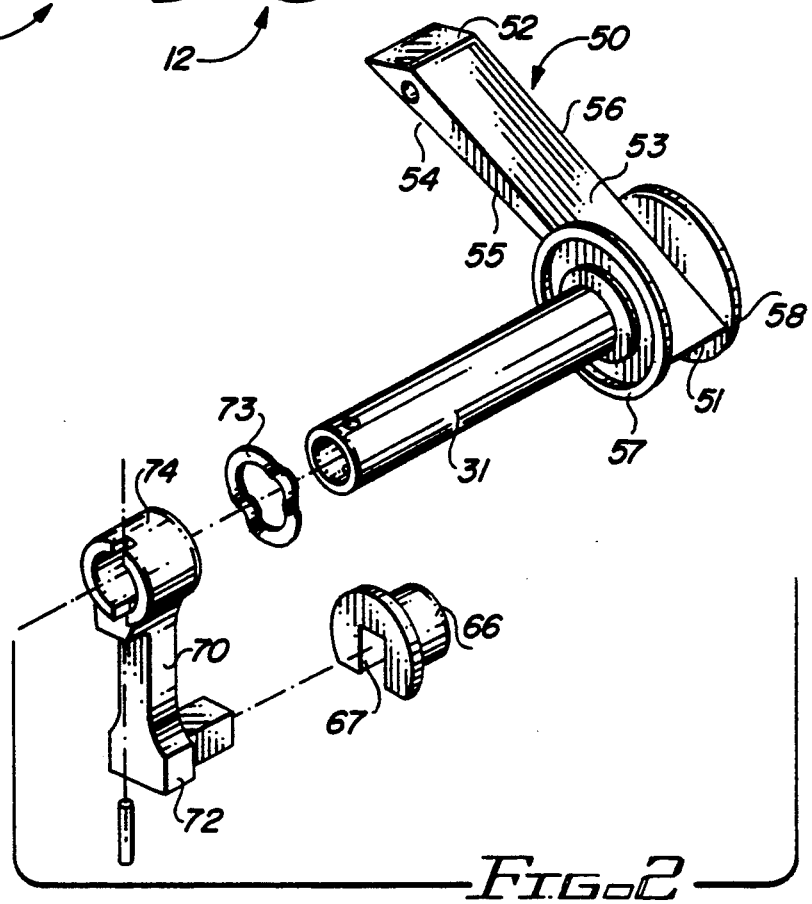
FIG. 2 is an exploded, perspective view of a diffuser vane which is a component of the assembly of FIG. 1.

Referring to the drawings, FIG. 1 shows a portion of a gas turbine engine generally denoted by the reference numeral 10. The gas turbine engine 10 is comprised in flow series arrangement of a compressor 12, a combustor 80, and a turbine 90 operatively coupled to the compressor 12 via a rotatable shaft, (not shown). A bleed port 82, (partly shown) is disposed between the compressor 12 and the combustor 80. Air entering the engine 10 is pressurized in the compressor 12, and then mixed with fuel and ignited in the combustor 80 to form a hot, pressurized gas. This gas is then expanded across the turbine 90 to supply the work to drive the compressor 12 and any other accessories that are mounted to the engine 10. If pneumatic power is required, a control valve, (not shown), in the bleed port 82 is opened and the appropriate bleed flow represented by the arrow 21 is bled from the engine 10.

The compressor 12 includes a housing 14 coupled to a cover plate 16 and circumscribing an impeller 18 mounted for rotation on the shaft of the engine 10. The impeller 18 is disposed within a flow path represented by the arrows 20.

Figure 3:
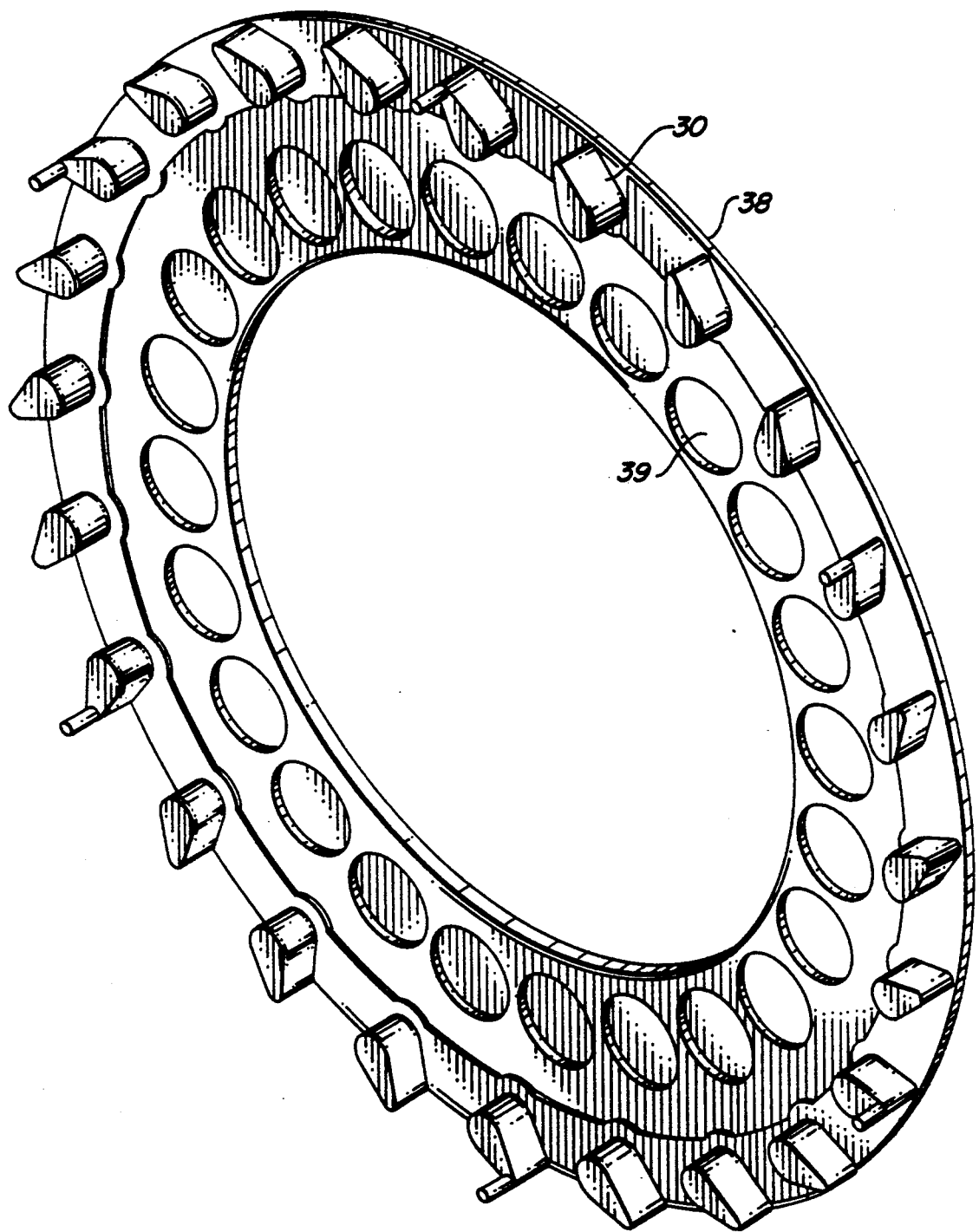
FIG. 3 is a perspective view of a diffuser wall which is a component of the assembly of FIG. 1.

The compressor housing 14 includes a first annular wall 28 and a second annular wall 38. The walls 28 and 38 are spaced apart and define an annular diffuser passageway 26 downstream of the impeller 18 and in fluid communication therewith. The first wall 28 is disposed between the diffuser passageway 26 and the cover plate 16, while the second wall 38 is disposed between the diffuser passageway 26 and the turbine 90. Thus, the second wall 38 is exposed to much higher temperatures than the first wall 28. The first and second walls 28,38 are coupled together by a plurality of circumferentially spaced aerodynamically shaped struts 30 which extend across the diffuser passageway 26. As shown in FIG. 3, the diffuser wall 38 has a plurality of circumferentially disposed disk shaped recesses 39. Likewise, the diffuser wall 28 has similar recesses 29, (see FIG. 1). Importantly, the walls 28,38 are positioned relative to each other so that the recesses 29 align with the recesses 39. Preferably, the recesses 29,39 are made with as large a diameter as the compressor housing 14 will accommodate. At the center of each of the recesses 29 is a hole 33 which opens into a bore 32 that extends through the first wall 28 to a second hole 34 which opens into the interior of the cover plate 16. Slip fit into each of the holes 33,34 is a non-metallic gearing or bushing 35. The bushings or bearings 35 are preferably made of carbon filled polymide compound.

A plurality of circumferentially spaced, aerodynamically configured, diffuser vanes 50 are disposed within the diffuser passageway 26 between the impeller 18 and the struts 30. Each of the vanes 50 has a leading edge portion 51, a trailing edge portion 52, a pressure side portion 53, a suction side portion 54, and vane endwalls 55, 56. The endwalls 55, 56 being perpendicular to the suction side portion 54 and the pressure side portion 53, all of which extend from the leading edge portion 51 to the trailing edge portion 52. Attached to the endwalls 55, 56 in the vicinity of the leading edge 51 are disks 57 and 58 respectively. Because it is in the vicinity of the leading edge 51 that most of the leakage across the endwalls 55, 56 occurs, it is important that the disks 57, 58 extend across this region. The disks 57, 58 can be welded or brazed to the vanes 50. Further, the vanes 50 can be attached to the disks 57, 58 along the centerline of these disks or offset from the centerline. The disks 57, 58 are sized to rotatably fit within the recesses 29, 39 respectively. Extending perpendicularly from each of the disks 57 is a shaft 31. The shafts 31 are sized to fit within the bores 32 and extend therethrough where they are rotatably mounted on the bushings 35, (see FIG. 1). Thus, the vanes 50 swing about the axis of the disks 57, 58 as the shafts 31 are rotated.

Figure 4A:
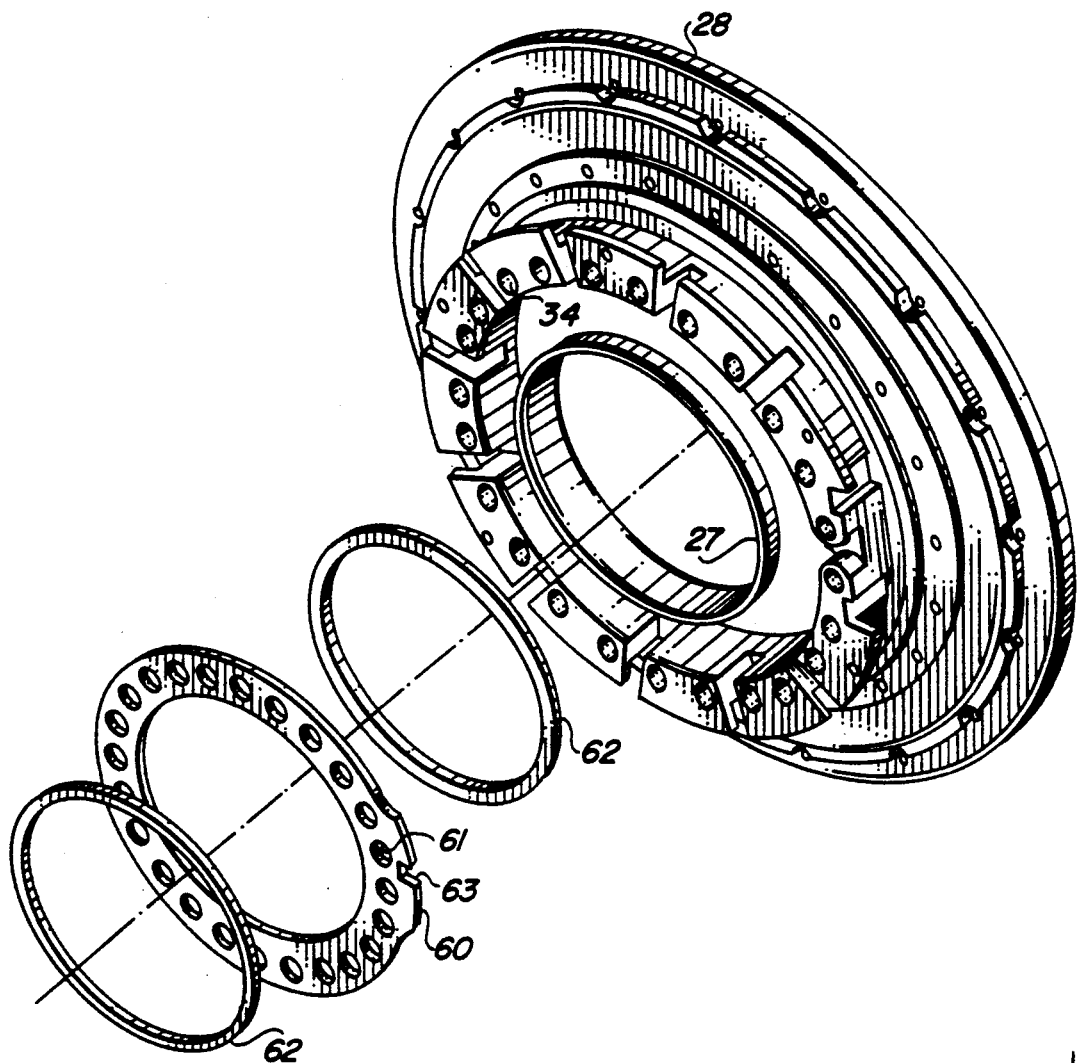
FIG. 4 (A through C) is a series of exploded, perspective views illustrating the assembly of a portion of the variable diffuser vane assembly of FIG. 1.
Figure 4B:
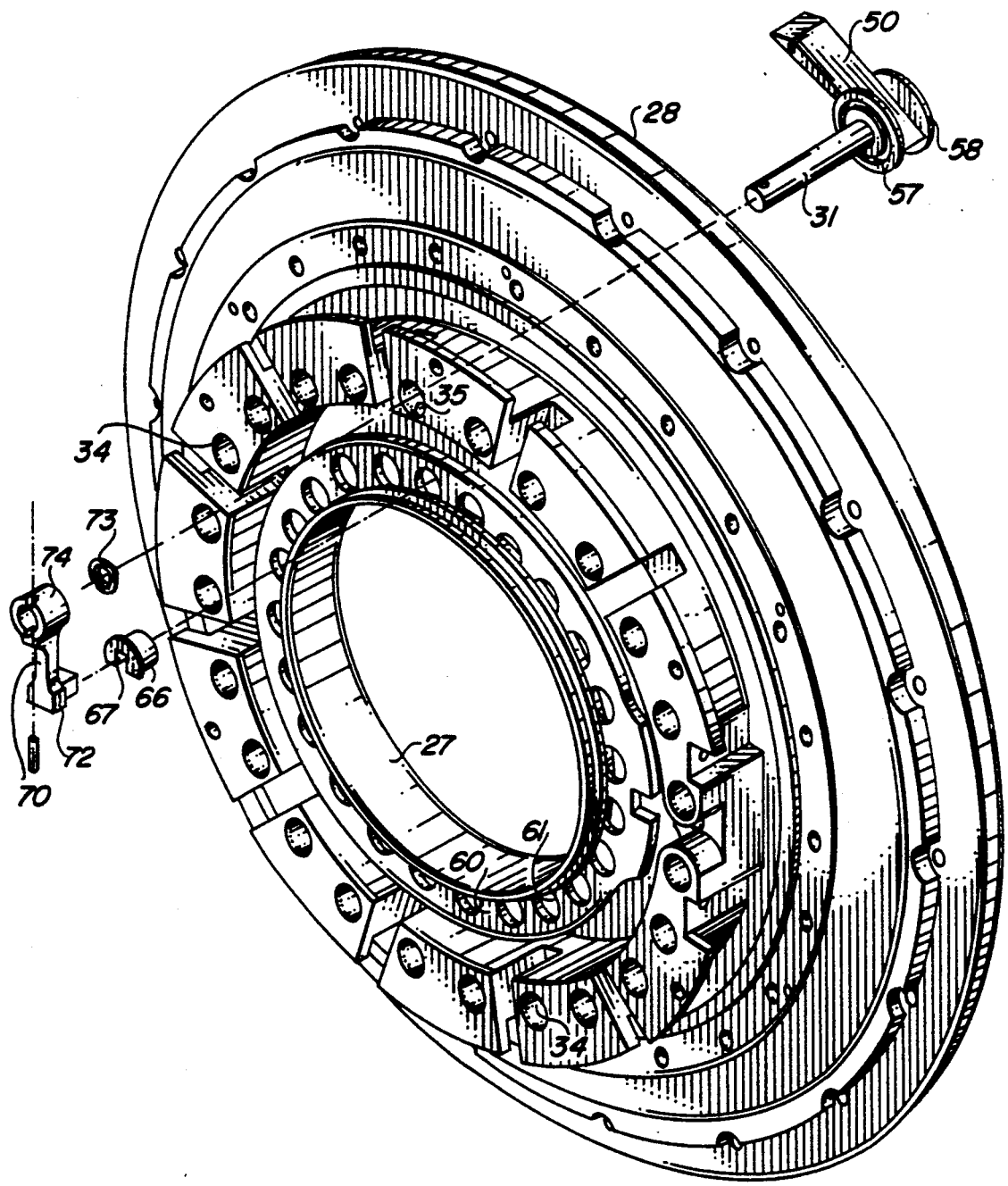
Figure 4C:
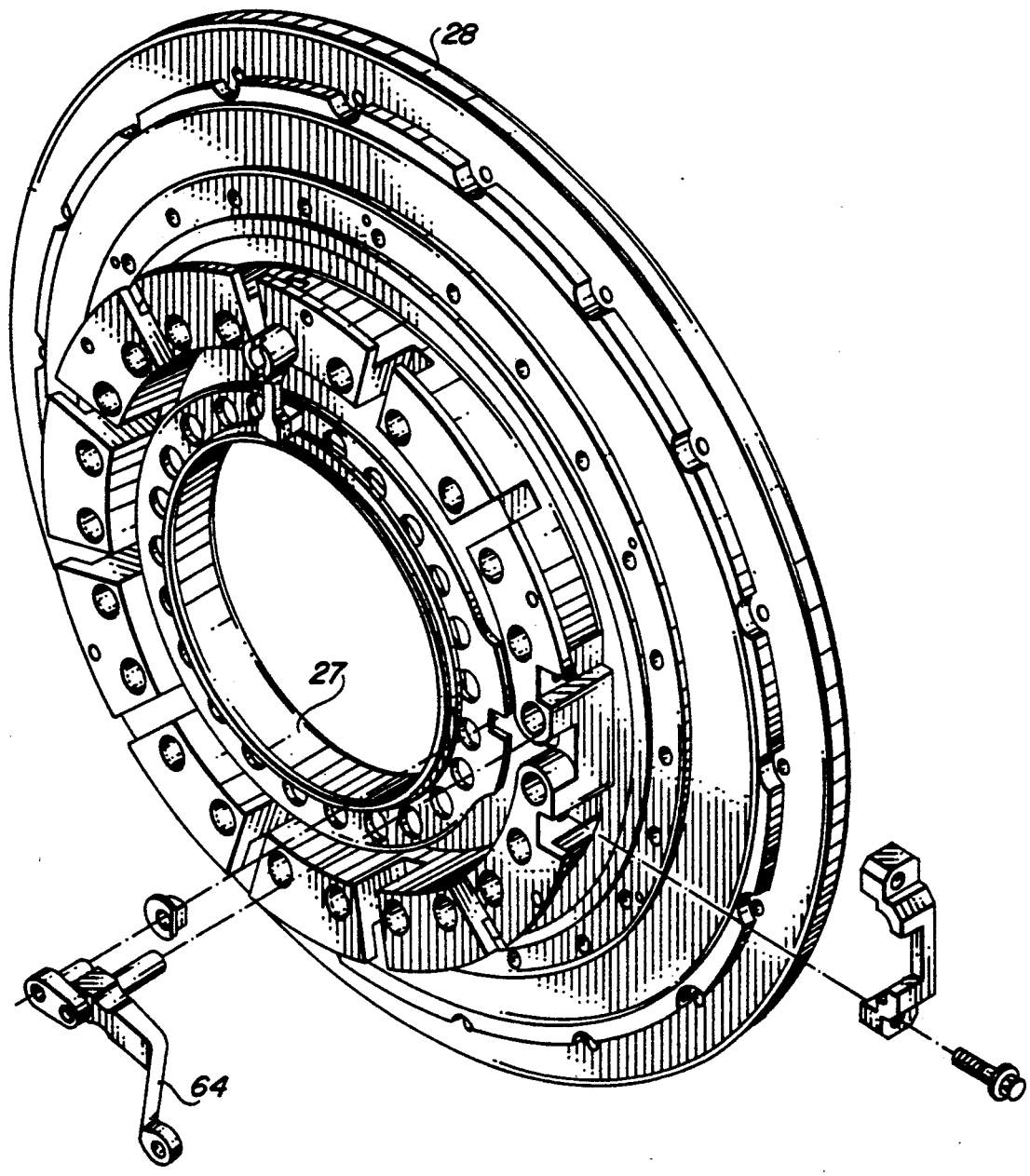

As shown in FIGS. 4A-4C, on the side of the wall 28 opposite the diffuser passageway 26, a unison ring 60 having a plurality of circumferentially spaced holes 61 is mounted for rotation between two non-metallic bearings 62 on a hub portion 27 of the wall 28. The ring 60 has a slot 63 for receiving an input lever 64 mounted to the wall 28. The input lever 64 is coupled to an actuator, (not shown). Also, a non-metallic unison ring bushing 66, with a rectangular slot 67, is slip fit within each of the holes 61.

A diffuser vane arm 70 has a rectangularly shaped base portion 72 configured for slideably mating with the rectangular slot 67 of the bushing 66 so that as the unison ring 60 rotates about the centerline of the engine 10 the base portion 72 is free to move laterally therein. Importantly, because the bushings 66 are non-metallic, they are less susceptible to thermal expansion effects and consequently tight clearances between the bushing 66 and the base portion 72 can be achieved. At the end of the arm 70, opposite the base portion 72, is a ring 74 for receiving and locking onto the shaft 31. A spring washer 73 is mounted within the ring 74. Each of the bushings 66 is linked to one of the shafts 31 by a diffuser vane arm 70.

In operation, upon receiving an appropriate command form the engine's electronic control unit, an actuator, (not shown), is commanded to move the lever 64 which in turn causes the unison ring 60 to rotate. Each of the bushings 66 rotates along with the unison ring 60 and also rotates within the holes 61, thereby causing the shafts 31 to rotate and hence each of the vanes 50 to simultaneously rotate to the same angular position. The use of nonmetallic bushings and bearings results in reduced friction and tighter clearances throughout the assembly, which in turn results in precise positioning of the vanes and the elimination of backlash.

Various modifications and alterations to the above described preferred embodiment will be apparent to those skilled in the art. Accordingly, this description of of the invention should be considered exemplary in nature and not as limiting to the scope and spirit of the invention as set forth in the following claims.

What is claimed is:

1. In a gas turbine engine having in flow series arrangement a compressor having a variable geometry diffuser, and a hot section including a combustor and a turbine, wherein said turbine is coupled to said compressor via a shaft, said compressor comprising:
   a radial impeller mounted on said shaft and having an air inlet and an air outlet;
   a housing including a first annular wall, having a front and back surface, circumscribing said impeller and a second annular wall having a front and back surface spaced apart from said first wall, said front surface of said first wall facing said front surface of said second wall and defining therebetween a diffuser passageway downstream of said impeller and in fluid communication with said air outlet, each of said front surfaces having a plurality of circumferentially disposed circular recesses positioned so that each recess on said front surface of said first wall aligns with one of said recesses on said front surface of said second wall, each of said recesses on said first wall opening into a bore that extends through said first wall, said first and second walls positioned within said gas turbine engine so that said only said back surface of said second wall is exposed to said hot section;
   a plurality of circumferentially spaced diffuser vanes, each extending from a leading edge to a trailing edge and having disposed therebetween, a pressure side portion, a suction side portion and a first and second endwall, said endwalls being substantially perpendicular to said suction side portion and said pressure side portion, a first disk member attached to said first endwall and rotatably received in one of said recesses in said first wall, and a second disk member attached to said second endwall and rotatably received in one of said recesses in said second wall, said diffuser vanes disposed in said diffuser passageway so that said leading edges face said air outlet and said endwalls face said annular walls,
   a plurality of shafts each secured at a first end to one of said first disks and mounted for rotation in one of said bores and extending therethrough;
   a unison ring mounted for rotation on said back surface of said first annular wall; and
   a plurality of arm members, each of said arm members secured for rotation at a first end to said unison ring and secured at a second end to one of said shafts, whereby in response to the rotation of said unison ring, each of said arms, shafts, and vanes are simultaneously rotated.

2. The compressor of claim 1 further comprising a plurality of circumferentially spaced aerodynamically shaped struts disposed in said diffuser passageway downstream of said diffuser vanes and attached to said front surfaces of said first and second walls.

3. The compressor of claim 1 wherein each of said first and second disks is adjacent said leading edge of one of said fissuser vanes.

4. A variable geometry diffuser assembly for a compressor having, mounted for rotation therein, a radial impeller with an air inlet and an air outlet, said assembly comprising:
   a housing having a first annular wall circumscribing said impeller and a second annular wall spaced apart from said first annular wall and defining therebetween a diffuser passageway downstream of said impeller and in fluid communication with said air outlet;
   a plurality of circumferentially spaced diffuser vanes, each of said vanes cantilevered to said first annular wall via a shaft secured to said vane and extending therefrom and through said first annular wall, and extending from a leading edge to a trailing edge and having disposed therebetween, a pressure side portion, a suction side portion and a first and second endwall, said endwalls being substantially perpendicular to said suction side portion and said pressure side portion, each of said vanes disposed in said diffuser passageway so that said leading edges face said air outlet, and said first and second endwalls face said first and second annular walls respectively;
   means for sealing disposed between said endwalls and said annular walls;
   a unison ring mounted for rotation to said first annular wall; and
   a plurality of arm members, each of said arm members secured for rotation at a first end to said unison ring and secured at a second end to one of said shafts, whereby in response to the rotation of said unison ring, each of said arms, shafts, and vanes are simultaneously rotated.

5. A linkage assembly for simultaneously rotating, in response to an actuator, a plurality of diffuser vanes circumferentially disposed in an annular diffuser passageway defined by interior surfaces of first and second annular walls in a centrifugal compressor, said linkage assembly comprising;
   a unison ring mounted for rotation to an exterior surface of said first annular wall and having a plurality of circumferentially spaced holes;
   an input lever coupled to said unison ring and to said actuator;
   a plurality of arm members each having a base portion and a head portion;
   a plurality of bushings, each of said bushings mounted in one of said unison ring holes and configured to slideably and rotatably receive said base portion of one of said arm members; and
   a plurality of shafts each coupled at one end to said head portion of one of said arm members and coupled at its other end to one of said diffuser vanes, each of said shafts mounted for rotation in one of a plurality of bores extending from said exterior surface of said first annular wall to said interior surface of said first annular wall.

6. The linkage assembly of claim 5 wherein said shafts are mounted on at least one non-metallic bearing disposed in each of said bores.

7. The linkage assembly of claim 6 wherein said bearing is made of a carbon filled polyimide compound.

8. The linkage assembly of claim 6 wherein said base portions have a rectangular key and said bushings have a rectangular slot for receiving said rectangular key.

9. The linkage assembly of claim 6 wherein said bushings are made of carbon filled polymide compound.

* * * * *